United States Patent
Feijoo et al.

(10) Patent No.: US 11,706,205 B2
(45) Date of Patent: *Jul. 18, 2023

(54) EXTENDING SINGLE-SIGN-ON TO RELYING PARTIES OF FEDERATED LOGON PROVIDERS

(71) Applicant: Citrix Systems, Inc., Fort Lauderdale, FL (US)

(72) Inventors: Ricardo Fernando Feijoo, Fort Lauderdale, FL (US); Thomas Kludy, Cooper City, FL (US)

(*) Notice: Subject to any disclaimer, the term of this patent is extended or adjusted under 35 U.S.C. 154(b) by 230 days.

This patent is subject to a terminal disclaimer.

(21) Appl. No.: 16/900,229

(22) Filed: Jun. 12, 2020

(65) Prior Publication Data

US 2020/0314088 A1   Oct. 1, 2020

Related U.S. Application Data

(63) Continuation of application No. 15/679,686, filed on Aug. 17, 2017, now Pat. No. 10,721,222.

(51) Int. Cl.
*H04L 9/40* (2022.01)
*G06F 21/33* (2013.01)
(Continued)

(52) U.S. Cl.
CPC ........ *H04L 63/0815* (2013.01); *G06F 21/335* (2013.01); *G06F 21/41* (2013.01); *H04L 63/0807* (2013.01); *G06F 21/40* (2013.01)

(58) Field of Classification Search
CPC ........ G06F 21/335; G06F 21/40; G06F 21/41; H04L 63/0807; H04L 63/0815
See application file for complete search history.

(56) References Cited

U.S. PATENT DOCUMENTS

| | | | |
|---|---|---|---|
| 7,562,382 B2* | 7/2009 | Hinton | H04L 67/30 713/168 |
| 7,685,206 B1* | 3/2010 | Mathew | H04L 63/105 707/785 |

(Continued)

FOREIGN PATENT DOCUMENTS

| | | |
|---|---|---|
| EP | 3669512 A1 | 6/2020 |
| WO | 2019036337 A1 | 2/2019 |

OTHER PUBLICATIONS

Search Query Report from IP.com (performed Apr. 27, 2022) (Year: 2022).*

(Continued)

*Primary Examiner* — Sharon S Lynch

(57) ABSTRACT

Aspects of the disclosure relate to extending single-sign-on to relying parties for federated logon providers. An enterprise identity provider server may receive a first authentication token previously issued to an enterprise server by the enterprise identity provider server. Subsequently, the enterprise identity provider server may retrieve, from a token store, a second authentication token associated with a federated identity service provided by a federated identity provider server. The enterprise identity provider server may refresh the second authentication token with the federated identity service provided by the federated identity provider server to obtain a refreshed authentication token. Finally, the enterprise identity provider server may send the refreshed authentication token to the enterprise server, which may enable user devices managed by the enterprise server to access one or more resources provided by a third party system using the federated identity service.

17 Claims, 12 Drawing Sheets

(51) Int. Cl.
*G06F 21/41* (2013.01)
*G06F 21/40* (2013.01)

(56) References Cited

U.S. PATENT DOCUMENTS

| | | | |
|---|---|---|---|
| 7,698,375 B2* | 4/2010 | Hinton | H04L 63/0823 709/227 |
| 8,181,225 B2* | 5/2012 | Hinton | H04L 67/30 709/225 |
| 8,364,969 B2* | 1/2013 | King | H04L 9/3213 713/182 |
| 8,613,055 B1* | 12/2013 | Tomilson | G06F 21/00 726/20 |
| 8,844,013 B2* | 9/2014 | Vangpat | H04L 9/3213 726/8 |
| 9,009,806 B2* | 4/2015 | Hyland | H04L 63/0861 726/8 |
| 9,106,642 B1* | 8/2015 | Bhimanaik | H04L 63/0807 |
| 9,338,007 B1* | 5/2016 | Doshi | H04L 63/0815 |
| 9,397,990 B1* | 7/2016 | Taly | H04L 63/08 |
| 9,473,468 B2* | 10/2016 | Gupta | H04L 9/0643 |
| 9,560,036 B2* | 1/2017 | Hinton | H04L 9/3228 |
| 9,779,233 B2* | 10/2017 | Mukherjee | H04L 63/06 |
| 9,819,665 B1* | 11/2017 | Machani | H04L 9/3234 |
| 9,948,610 B2* | 4/2018 | Broadbent | H04L 63/0281 |
| 9,979,712 B2* | 5/2018 | Bhimanaik | G06F 21/335 |
| 10,021,088 B2* | 7/2018 | Innes | H04L 9/3263 |
| 10,122,703 B2* | 11/2018 | Innes | H04L 63/0815 |
| 10,171,241 B2* | 1/2019 | Xu | H04L 9/32 |
| 10,230,715 B2* | 3/2019 | Hyland | H04L 63/0861 |
| 10,243,945 B1* | 3/2019 | Kruse | H04L 63/126 |
| 10,270,753 B2* | 4/2019 | Khylkouskaya | H04L 9/3228 |
| 10,341,410 B2* | 7/2019 | Lander | H04L 67/02 |
| 10,425,386 B2* | 9/2019 | Wardell | H04L 63/0281 |
| 10,454,940 B2* | 10/2019 | Lander | H04L 63/0815 |
| 10,516,672 B2* | 12/2019 | Gupta | G06F 21/41 |
| 10,530,578 B2* | 1/2020 | Keshava | G06F 12/1466 |
| 10,530,763 B2* | 1/2020 | Burch | H04L 63/0823 |
| 10,721,222 B2 | 7/2020 | Feijoo et al. | |
| 10,785,201 B2* | 9/2020 | Bhimanaik | H04L 63/0815 |
| 2006/0048216 A1* | 3/2006 | Hinton | H04L 63/0815 726/8 |
| 2006/0218628 A1* | 9/2006 | Hinton | H04L 63/0815 726/8 |
| 2008/0059804 A1* | 3/2008 | Shah | H04L 63/0884 726/8 |
| 2008/0072301 A1* | 3/2008 | Chia | H04L 63/0815 726/8 |
| 2009/0119763 A1* | 5/2009 | Park | H04L 63/0815 726/8 |
| 2010/0251353 A1* | 9/2010 | Hodgkinson | H04L 63/0853 235/380 |
| 2011/0307947 A1 | 12/2011 | Kariv et al. | |
| 2012/0023556 A1* | 1/2012 | Schultz | G06F 21/41 726/8 |
| 2012/0023568 A1* | 1/2012 | Cha | G06F 21/335 726/10 |
| 2012/0054841 A1* | 3/2012 | Schultz | G06F 21/51 726/22 |
| 2012/0131660 A1 | 5/2012 | Dalzell et al. | |
| 2012/0204221 A1* | 8/2012 | Monjas Llorente | H04L 63/102 726/1 |
| 2012/0227087 A1* | 9/2012 | Brown | G06F 21/31 726/3 |
| 2012/0254957 A1* | 10/2012 | Fork | H04L 9/3234 726/6 |
| 2012/0317624 A1* | 12/2012 | Monjas Llorente | H04L 63/105 726/4 |
| 2012/0323717 A1* | 12/2012 | Kirsch | G06Q 20/0855 705/26.1 |
| 2013/0014258 A1* | 1/2013 | Williams | G06Q 30/0241 709/204 |
| 2013/0036455 A1* | 2/2013 | Bodi | H04L 63/0807 726/4 |
| 2013/0054454 A1* | 2/2013 | Purves | H04L 67/22 705/41 |
| 2013/0054968 A1* | 2/2013 | Gupta | H04L 67/2814 713/168 |
| 2013/0086645 A1* | 4/2013 | Srinivasan | H04L 9/3234 726/4 |
| 2013/0086657 A1* | 4/2013 | Srinivasan | H04L 9/3234 726/6 |
| 2013/0086670 A1* | 4/2013 | Vangpat | H04L 63/0815 726/8 |
| 2013/0133037 A1* | 5/2013 | Hwang | G06F 21/6218 726/4 |
| 2013/0173712 A1* | 7/2013 | Monjas Llorente | H04L 65/403 709/204 |
| 2013/0179573 A1* | 7/2013 | McCarty | H04L 63/0823 709/225 |
| 2013/0185426 A1* | 7/2013 | Chevillat | G06Q 10/10 709/225 |
| 2013/0191884 A1* | 7/2013 | Leicher | H04L 63/08 726/4 |
| 2013/0222839 A1* | 8/2013 | Armstrong | G06F 3/1231 358/1.14 |
| 2013/0276078 A1* | 10/2013 | Rockwell | H04L 63/102 726/7 |
| 2014/0020051 A1* | 1/2014 | Lu | H04L 63/10 726/4 |
| 2014/0041055 A1* | 2/2014 | Shaffer | G06Q 10/10 726/28 |
| 2014/0068746 A1* | 3/2014 | Gonzlez Martinez | H04L 67/2814 726/9 |
| 2014/0310792 A1* | 10/2014 | Hyland | H04L 63/0861 726/8 |
| 2015/0089597 A1* | 3/2015 | Srinivasan | H04L 63/08 726/4 |
| 2015/0188906 A1* | 7/2015 | Minov | H04L 63/062 726/8 |
| 2015/0188909 A1* | 7/2015 | Hyland | H04L 63/0861 726/4 |
| 2015/0341334 A1* | 11/2015 | Bhimanaik | G06F 21/335 726/4 |
| 2016/0006705 A1* | 1/2016 | Gupta | G06F 21/6227 713/168 |
| 2016/0050193 A1* | 2/2016 | Kanov | H04W 12/069 726/7 |
| 2016/0065563 A1* | 3/2016 | Broadbent | H04L 63/0281 726/9 |
| 2016/0094543 A1* | 3/2016 | Innes | H04L 63/061 726/6 |
| 2016/0094546 A1* | 3/2016 | Innes | G06F 21/33 713/156 |
| 2016/0259936 A1* | 9/2016 | Mukherjee | H04L 63/061 |
| 2017/0048233 A1* | 2/2017 | Khylkouskaya | H04L 9/3228 |
| 2017/0170963 A1* | 6/2017 | Xu | H04L 9/32 |
| 2017/0171201 A1* | 6/2017 | Matsugashita | H04L 63/20 |
| 2017/0223009 A1* | 8/2017 | Burch | H04L 63/0807 |
| 2017/0289134 A1* | 10/2017 | Bradley | H04L 63/105 |
| 2017/0302655 A1* | 10/2017 | Sondhi | H04L 63/10 |
| 2017/0324717 A1* | 11/2017 | Kravitz | H04L 63/08 |
| 2017/0329864 A1* | 11/2017 | Micucci | G06F 16/90 |
| 2017/0331802 A1* | 11/2017 | Keshava | H04L 9/0894 |
| 2018/0041336 A1* | 2/2018 | Keshava | H04L 9/0891 |
| 2018/0075231 A1* | 3/2018 | Subramanian | H04L 63/0807 |
| 2018/0077138 A1* | 3/2018 | Bansal | G06F 9/4881 |
| 2018/0077144 A1* | 3/2018 | Gangawane | H04L 63/102 |
| 2018/0083915 A1* | 3/2018 | Medam | H04L 63/08 |
| 2018/0097802 A1* | 4/2018 | Lander | H04L 63/083 |
| 2018/0205706 A1* | 7/2018 | Broadbent | H04L 63/0281 |
| 2018/0241734 A1* | 8/2018 | Bhimanaik | G06F 21/41 |
| 2018/0255057 A1* | 9/2018 | Hein | H04L 63/102 |
| 2018/0316657 A1* | 11/2018 | Hardt | H04L 63/08 |
| 2018/0337784 A1* | 11/2018 | Jain | H04W 12/084 |
| 2018/0337914 A1* | 11/2018 | Mohamad Abdul | H04L 9/3213 |

(56) References Cited

U.S. PATENT DOCUMENTS

2019/0007421 A1\* 1/2019 D .................... H04L 63/0807
2020/0314088 A1 10/2020 Feijoo et al.

OTHER PUBLICATIONS

Search Query Report from IP.com (performed Oct. 21, 2022) (Year: 2022).\*
Search Query Report from IP.com (performed Mar. 8, 2023) (Year: 2023).\*
Apr. 8, 2021—(AU) Notice of Acceptance—App. No. 2018318922 pp. 1-3.
Dec. 10, 2020—(JP) Decision to Grant a Patent—App. No. 2020-508558.
Sep. 3, 2021—(CN) Decisiont to Grant Patent Rights—App. No. 201880057752.8 (pp. 1-3).
Oct. 25, 2018 (EP)—International Search Report—App. PCT/US2018/046443.
Oct. 24, 2019—(US) Final Office Action—U.S. Appl. No. 15/679,686.
Mar. 2, 2020—(US) Notice of Allowance—U.S. Appl. No. 15/679,686.
Search Query Report from IP.com (performed Feb. 20, 2020).
Mar. 24, 2020—(EP) Communication concerning correction of deficiencies in written opinionpayment of claims fee.
May 10, 2021—(EP) allowance communication under Rule 71(3) EPC—App. No. 18762214.7.
Apr. 22, 2021—(CA) Official Action—App. No. 3,073,086, pp. 1-4.

\* cited by examiner

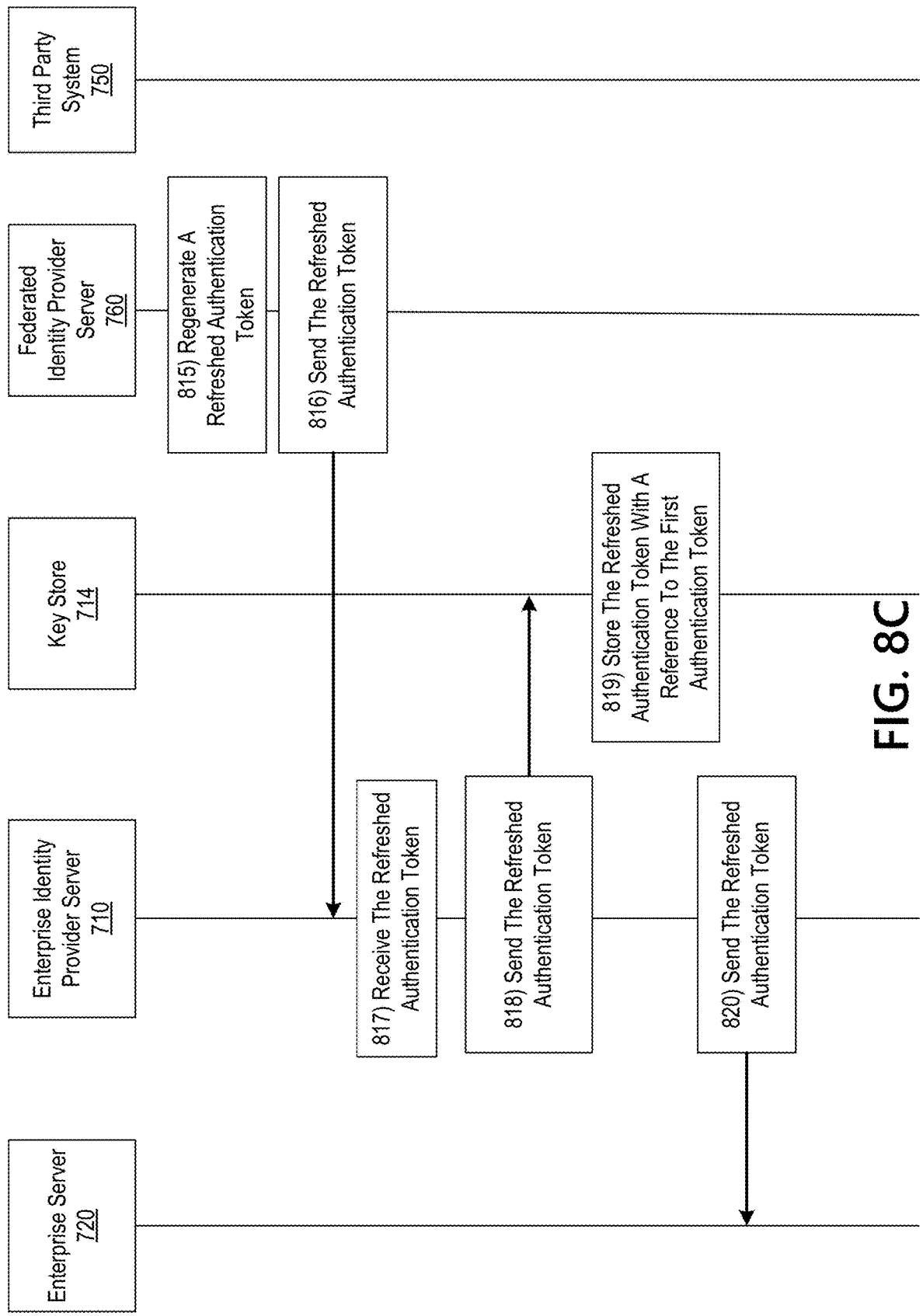

EXTENDING SINGLE-SIGN-ON TO RELYING PARTIES OF FEDERATED LOGON PROVIDERS

CROSS-REFERENCE

This application claims priority to co-pending U.S. application Ser. No. 15/679,686, filed Aug. 17, 2017, entitled EXTENDING SINGLE-SIGN-ON TO RELYING PARTIES OF FEDERATED LOGON PROVIDERS, which application is hereby incorporated by reference herein in its entirety.

TECHNICAL FIELD

Aspects of the disclosure relate to computer hardware and software. In particular, one or more aspects of the disclosure generally relate to computer hardware and software for generation and management of security tokens to interact with multiple services provided by various identity providers in a virtualized environment.

BACKGROUND

A virtual environment service provider may provide identity and access management for user devices to access various services and resources in a cloud-based environment. In particular, an identity provider may issue an authentication ticket or token that enables Single-Sign-On (SSO) access to connected systems and seamless sign on at each system. As enterprises in the cloud expand their services, the user devices may attempt to access services and resources provided by third party entities outside of their enterprises that may use different identity providers to support authentication. As a result, the authentication token that is specific to a virtual environment service provider might not be able to provide access to services to third party entities with seamlessness, efficiency and convenience.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards extending single-sign-on to relying parties of federated logon providers.

In accordance with one or more aspects of the disclosure, an enterprise identity provider server having at least one processor, memory, and a communication interface may receive, from an enterprise server integrated with an enterprise identity service provided by the enterprise identity provider server, a first authentication token previously issued to the enterprise server by the enterprise identity provider server. In response to receiving the first authentication token, a second authentication token, which may be associated with a federated identity service provided by a federated identity provider server, may be retrieved from a token store maintained by the enterprise identity provider server. Subsequently, the second authentication token may be refreshed with the federated identity service provided by the federated identity provider server to obtain a refreshed authentication token. Thereafter, the enterprise identity provider server may send the refreshed authentication token to the enterprise server, which may enable user devices managed by the enterprise server to access one or more resources provided by a third party system using the federated identity service.

In some instances, prior to the enterprise identity provider server receiving the first authentication token, the enterprise server may be provisioned with the first authentication token. For example, the first authentication token may enable the enterprise server and its managed user devices to have single-sign-on access to one or more resources using an enterprise identity server provided by the enterprise identity server. In another example, the second authentication token may enable the enterprise server and its managed user devices to have single-sign-on access to the third party system using the federated identity service.

In some instances, in response to refreshing the second authentication token, the token store may store the second refreshed authentication token and a reference associating the refreshed authentication token with the first authentication. In some instances, refreshing the second authentication token may cause the enterprise identity provider server to send a request to the federated identity provider server, where the federated identity provider server may generate the refreshed authentication token. Further, the enterprise identity provider server may receive the refreshed authentication token from the federated identity provider server and update the token store with the refreshed authentication token and a reference associating the refreshed authentication token with the first authentication token. As a result, the enterprise identity provider server may later retrieve, from the token store, the second authentication token based on the reference associating the second authentication token with the first authentication token.

In some instances, the enterprise identity provider server may receive a request from the enterprise server to access the one or more resources provided by the third party system using the federated identity service. As such, the enterprise identity provider server may redirect the request from the enterprise server to the federated identity service provided by the federated identity provider server.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 8A-8D depict an example event sequence for extending single-sign-on to relying parties of federated logon providers in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
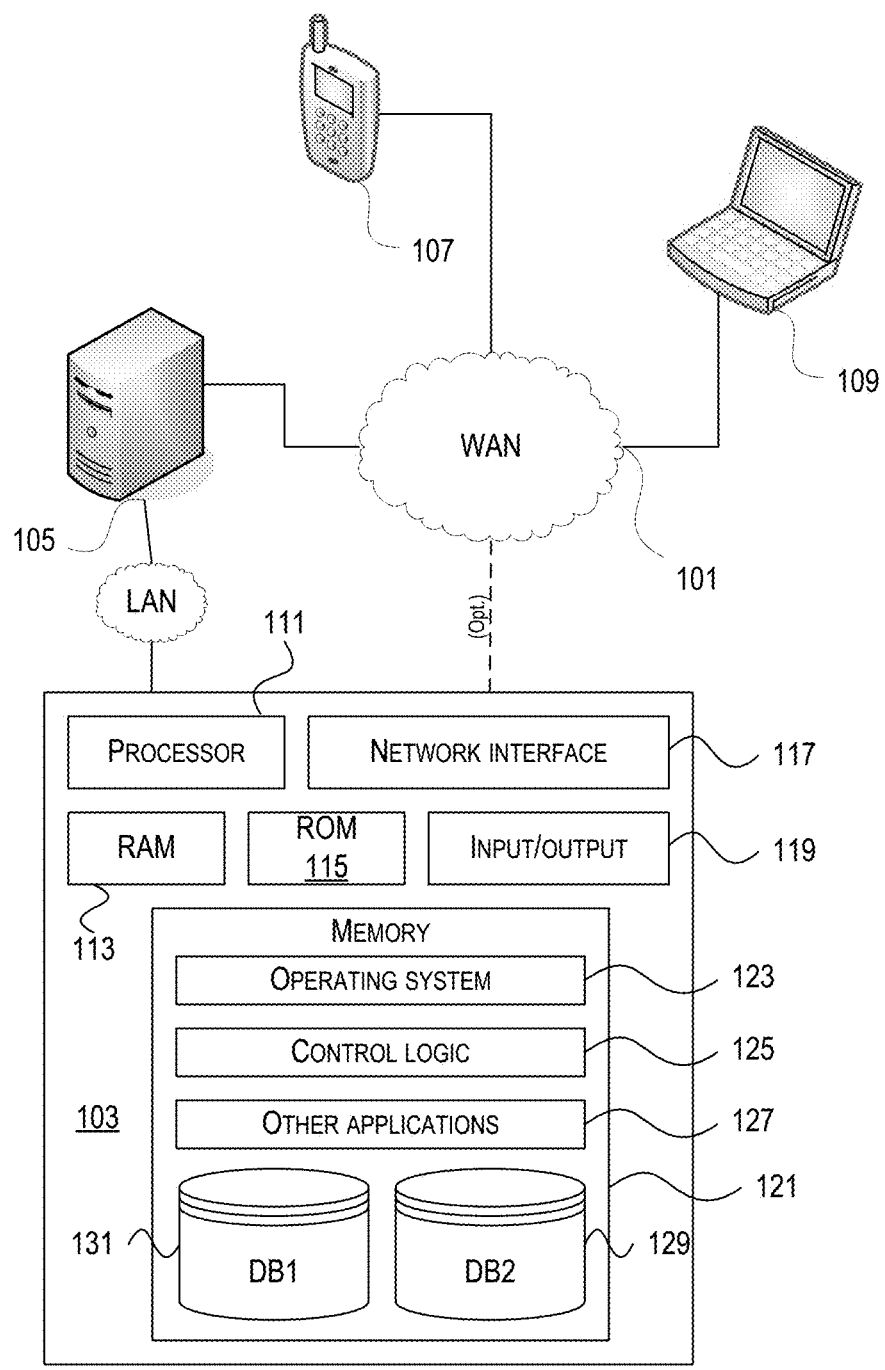
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML).

The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
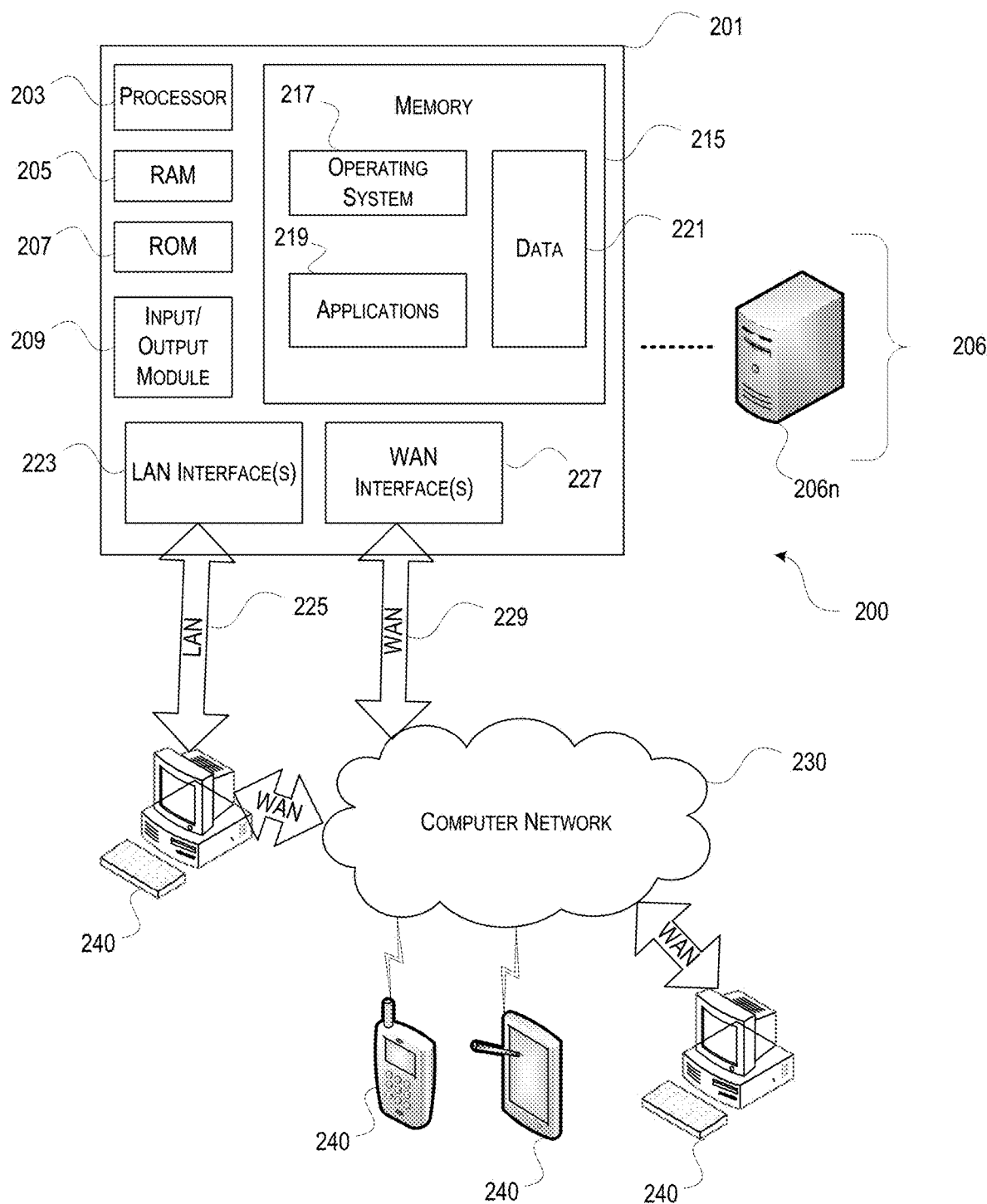
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
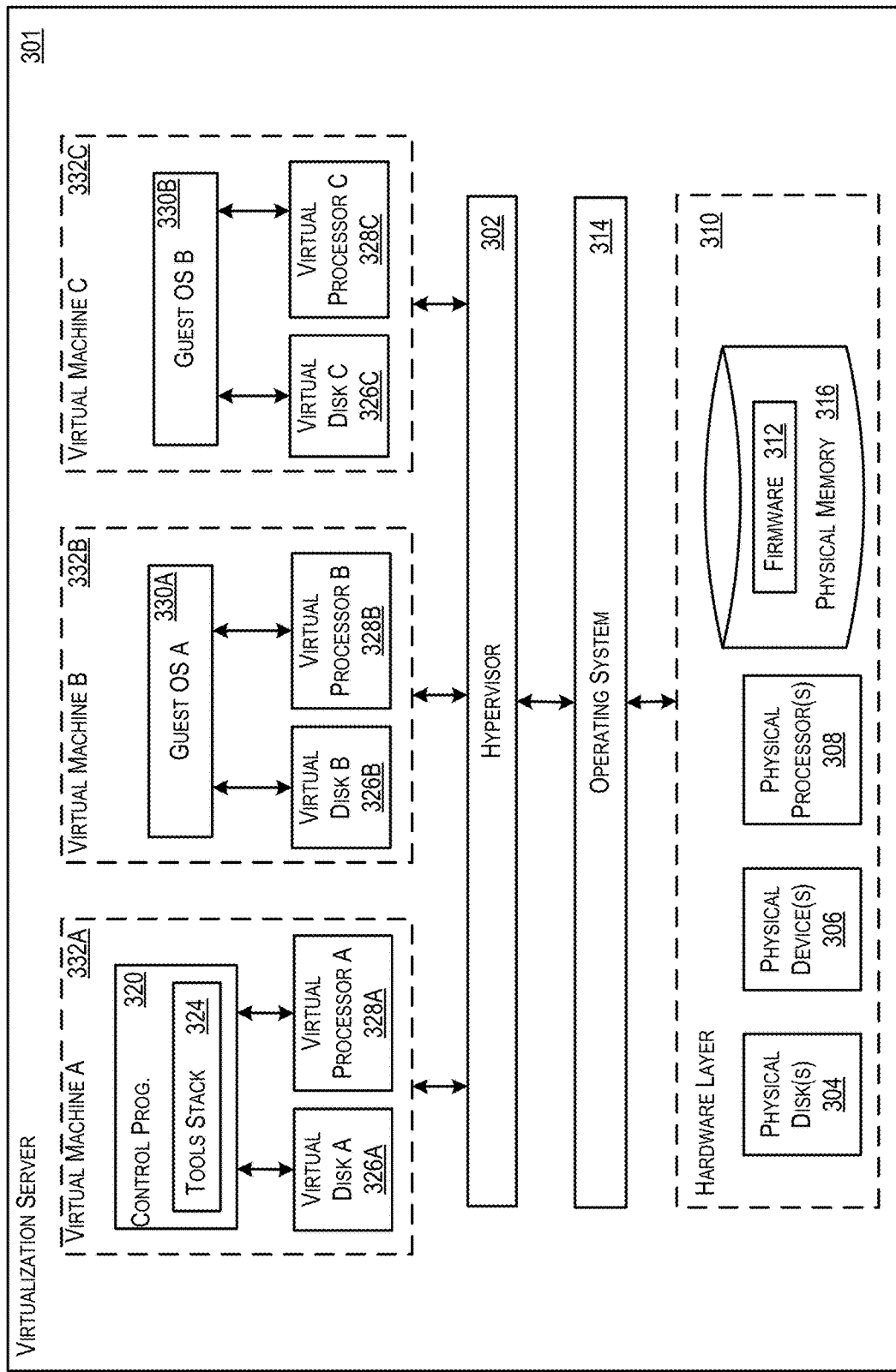
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
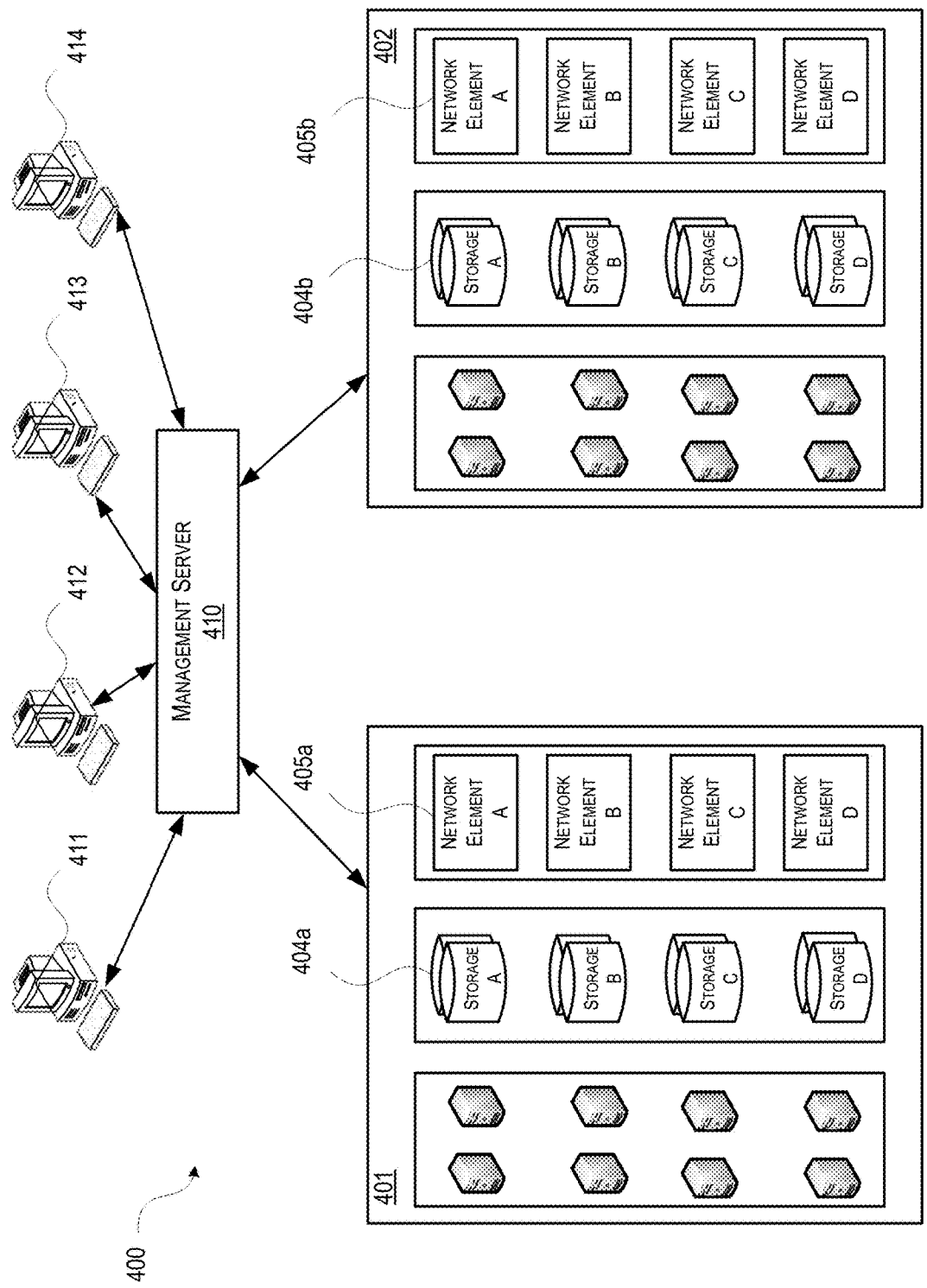
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
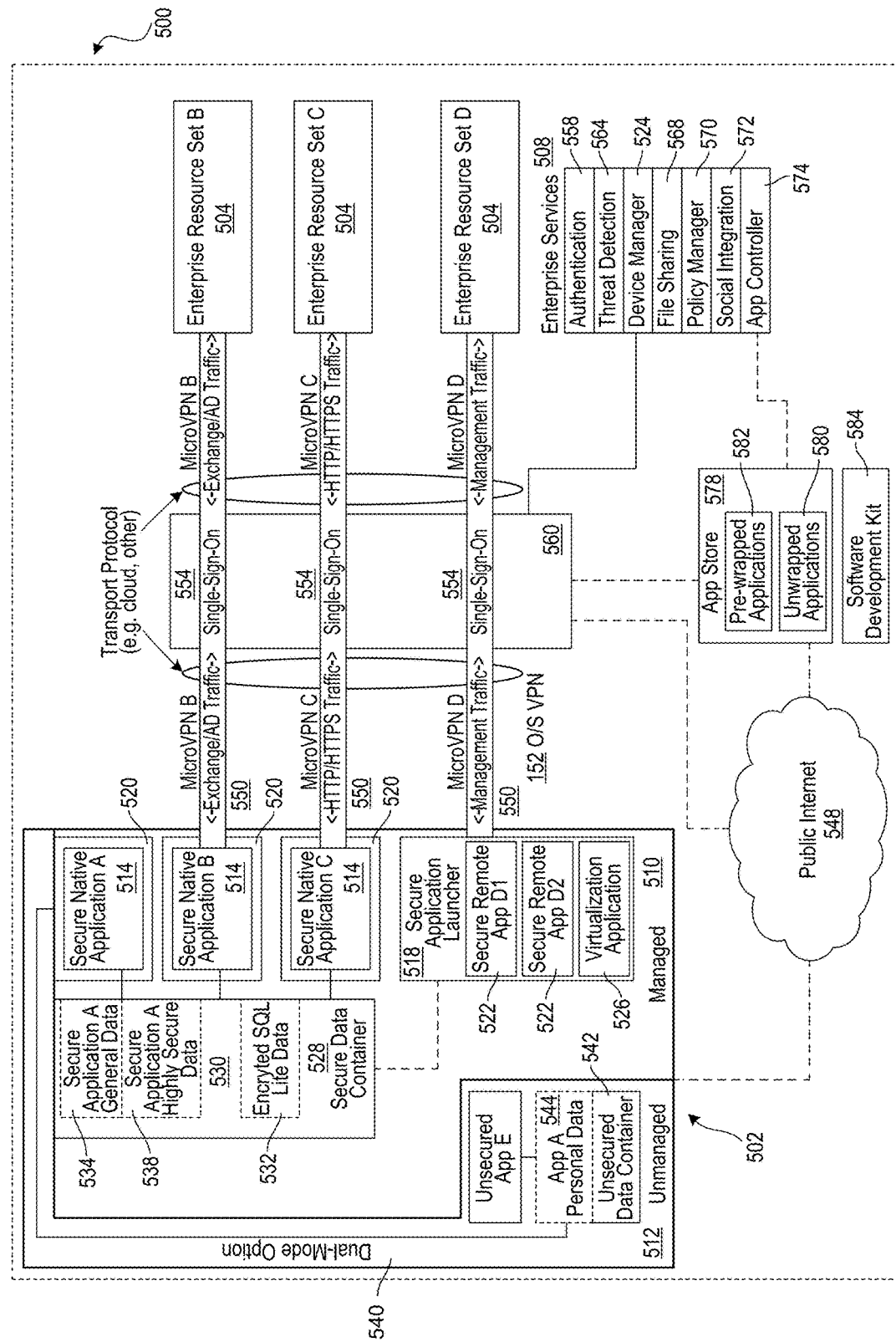
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is impenetrable by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications 550, particular devices, particular secured areas on the mobile device 552, and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
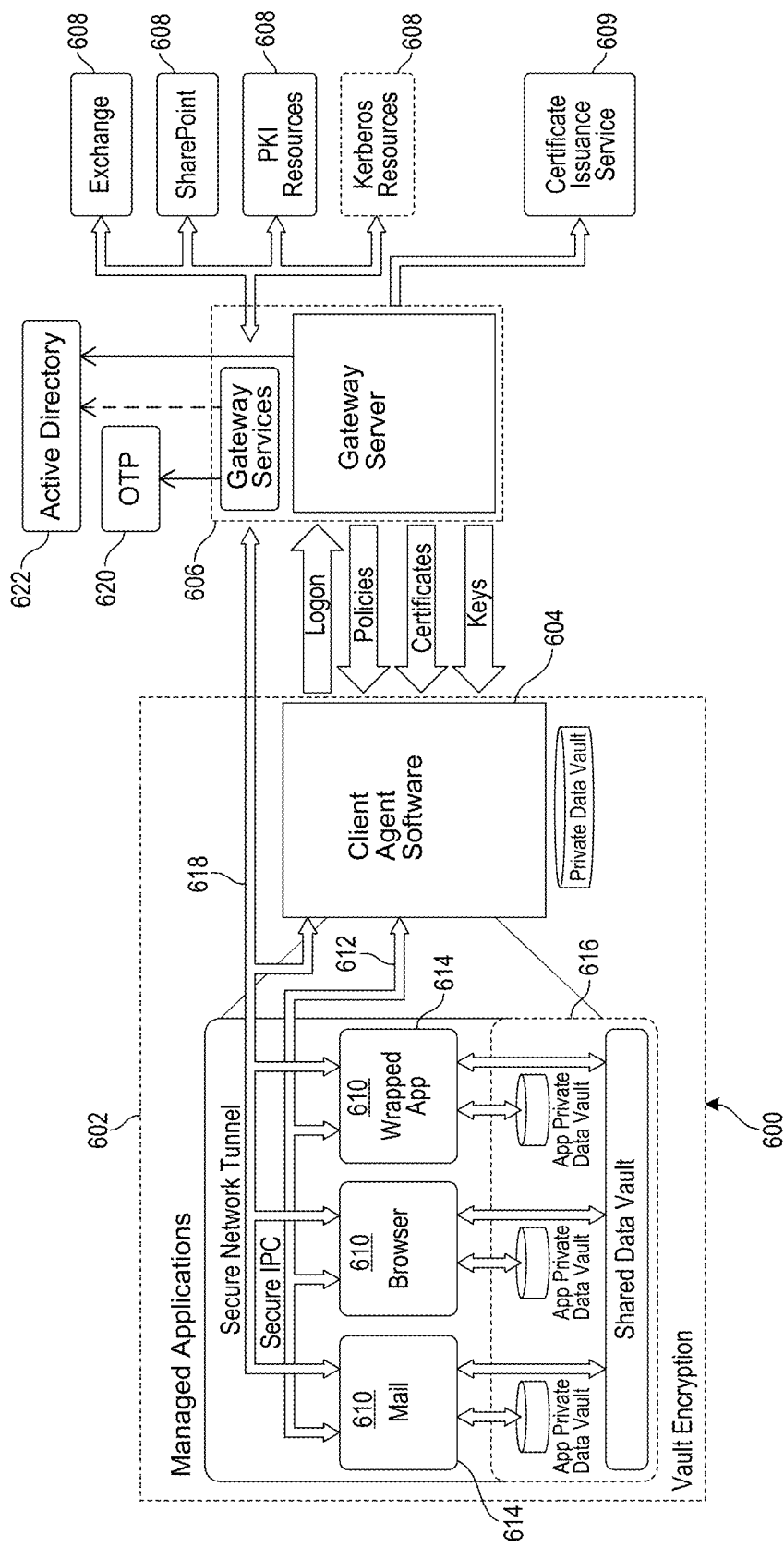
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Extending Single-Sign-on to Relying Parties of Federated Logon Providers

As discussed above, aspects of the disclosure relate to extending single-sign-on to relying parties of federated logon providers. In addition, one or more aspects of the disclosure may incorporate, be embodied in, and/or be implemented using one or more of the computer system architecture, remote-access system architecture, virtualized (hypervisor) system architecture, cloud-based system architecture, and/or enterprise mobility management systems discussed above in connection with FIGS. 1-6.

Figure 7:
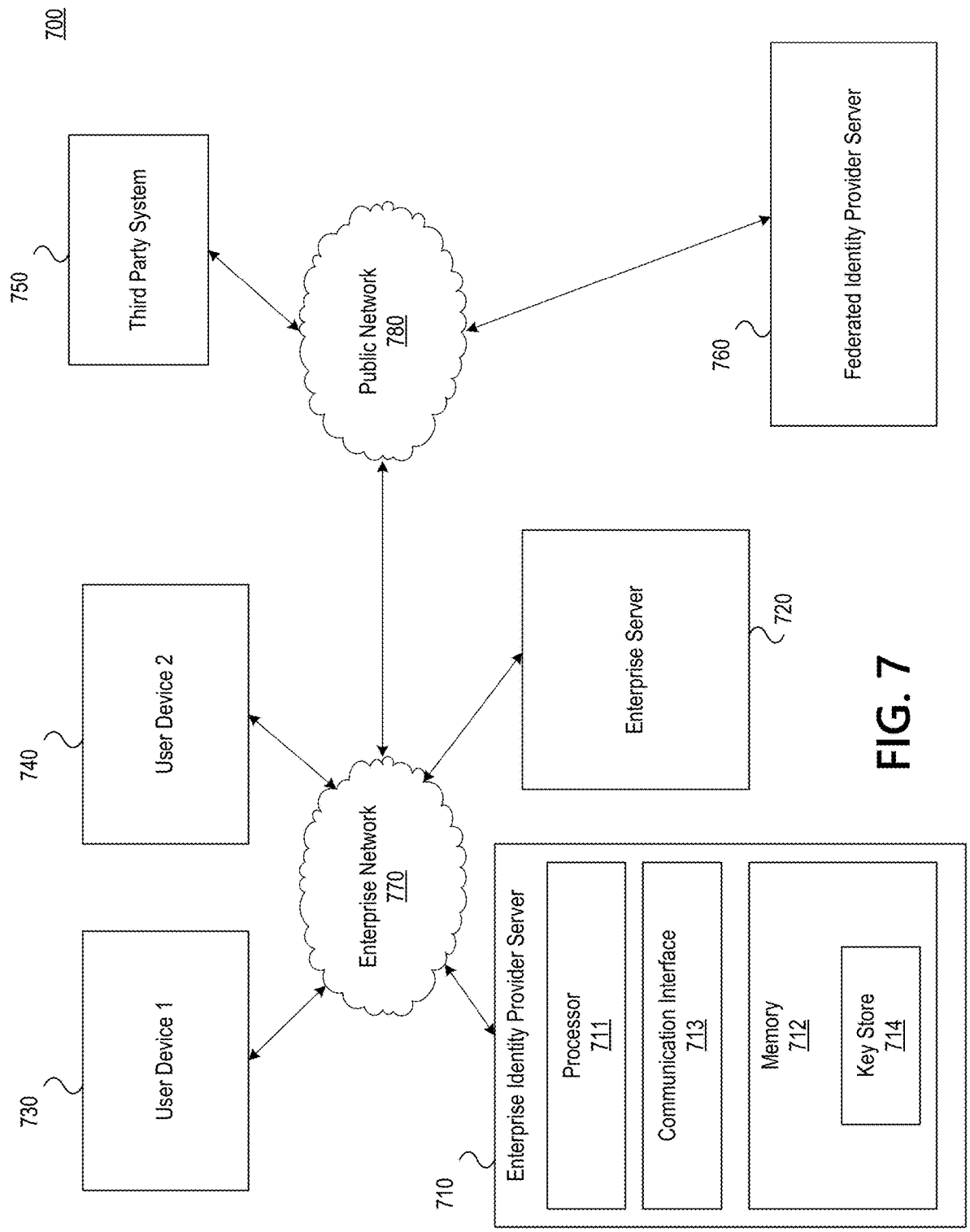
FIG. 7 depicts an illustrative computing environment for extending single-sign-on to relying parties of federated logon providers in accordance with one or more illustrative aspects described herein.

FIG. 7 depicts an illustrative computing environment for extending single-sign-on to relying parties of federated logon providers in accordance with one or more illustrative aspects described herein. Referring to FIG. 7, computing environment 700 may include an enterprise identity provider server 710, an enterprise server 720, user devices 730 and 740, a third party system 750, a federated identity provider server 760, an enterprise network 770 and a public network 780. Enterprise identity provider server 710, enterprise server 720, user devices 730 and 740, third party system 750, and federated identity provider server 760 may include one or more physical components, such as one or more processors, memories, communication interfaces, and/or the like.

Enterprise identity provider server 710 may include processor 711, memory 712, and communication interface 713. Processor 711 may execute instructions stored in memory 712 to cause enterprise identity provider server 710 to perform one or more functions, such as retrieving a second authentication token based on a reference to the first authentication token. Communication interface 713 may include one or more network interfaces via which enterprise identity provider server 710 can communicate with one or more other systems and/or devices in computing environment 700, such as enterprise server 720, user devices 730 and 740, third party system 750, and federated identity provider server 760. Memory 712 may include a key store 714. In an example, upon receiving an authentication token from federated identity provider server 760, enterprise identity provider server 710 may store the authentication and a reference associating the authentication token with another, corresponding authentication token in key store 714. In another example, enterprise identity provider server 710 may store refreshed authentication tokens and associated references in key store 714, as discussed in greater detail below.

In some examples, as illustrated in FIG. 7, key store 714 may reside in memory 712 of enterprise identity provider server 710. In alternative arrangements, enterprise identity provider server 710 and key store 714 may reside on the separate computing devices, and key store 714 may be managed by enterprise identity provider server 710 remotely. Key store 714 may include a hardware security module (HSM) that safeguards and manages digital keys for authentication and provides crypto processing. Key store 714 may be part of a mission-critical infrastructure that stores digital keys of high-value, which means there might be a significant, negative impact to the owner of the key if it were compromised. In some embodiments, key store, HSMs and/or the cryptographic modules may be certified to internationally recognized standards such as Common Criteria or Federal Information Processing Standard (FIPS) to provide users with independent assurance that the design and implementation of the product and cryptographic algorithms are sound. The functionalities of key store 714 and the corresponding HSM may be implemented either in software or hardware.

Enterpriser server 720 may be associated with an enterprise organization and may send and receive information to user devices 730 and 740 and other computing devices of computing environment 700. Enterpriser server 720 may manage user devices 730 and 740. Enterprise users may access system resources through user devices 730 and 740. User devices 730 and 740 may be any type of computing device including, for example, a server, computer, laptop, tablet, smartphone, or other client device that includes a processor (e.g., computing device 201). User devices 730 and 740 may communicate, via their communication interfaces (e.g., wireless interfaces, LAN interfaces, WLAN interfaces), with other devices and/or entities such as enterpriser server 720, enterprise identity server 710, and federated identity provider server 760, as discussed in greater detail below. User devices 730 and 740 may also communicate with various network nodes described herein.

Enterpriser server 720 may include a relying party, which may be a server responsible for providing and managing a virtual, cloud-based environment that may be accessed by one or more enterprise users via user devices 730 and 740. In an example use case, the relying party may be a server of an enterprise that an employee logs into for authentication to access the enterprise's virtual, cloud-based environment (e.g., a virtual desktop, a virtual application, a virtual mobile app, or other virtual service(s)).

Enterprise identity provider server 710 may be a server responsible for providing an identity management platform in enterprise network 770. Specifically, enterprise identity provider server 710 may be responsible for generating, updating, and managing tokens for enterprise users and/or their respective devices to use in authenticating with and accessing the virtual, cloud-based environment. As such, the relying party may obtain an authentication token from enterprise identity provider server 710 on behalf of user devices 730 and 740 that enable them to access the services and resources in an enterprise system. For example, a relying party may direct the user to log into an identity management platform provided by enterprise identity provider server 710 and obtain a first authentication token.

Enterprise identity provider server 710 may issue a first authentication token to an authenticated user as a result of successfully completing an authentication procedure (e.g., logging in) in enterprise network 770. In one example, user devices 730 and 740 may log into a virtualized, cloud-based environment using their existing authentication credentials, which may be a username and password, biometric measurement (e.g., fingerprint scan, retina scan, facial recognition, voice recognition, etc.), entering an access code provided to a specified user device (e.g., the user's smartphone may receive a message containing a code to enter into a portal provided by the relying party), or any other authentication means for access to enterprise network 770. In response to the successful logging in of user devices 730 and 740, enterprise identity provider server 710 may issue a first authentication token for the authenticated user and forward the first authentication token to enterpriser server 720, which in turn may enable user devices 730 and 740 to have SSO access to the services and resources in the virtualized, cloud-based environment within enterprise network 770. In this fashion, enterprise identity provider server 710 may provision enterprise server 720 with the first authentication token. As an example, enterprise server 720 may store the first authentication token in key store 714 and may retrieve a previously stored second authentication token from key store 714 to enable user devices 730 and 740 to have access to the services and resources in the virtualized, cloud-based environment of an enterprise system within enterprise network 770.

Enterprise network 770 and public network 780 may include one or more wide area networks and/or local area networks and may interconnect one or more systems and/or devices included in computing environment 700. For example, enterprise network 770 may interconnect enterprise identity provider server 710, enterprise server 720, and user devices 730 and 740. Public network 770 may interconnect third party system 750 and federated identity provider server 760. Enterprise network 770 and public network 780 may be interconnected with each other, which may implement intercommunications among enterprise identity provider server 710, enterprise server 720, user devices 730 and 740, third party system 750, and federated identity provider server 760.

System 700 may include one or more federated identity provider servers 760, which may be responsible for generating, updating, and managing tokens of users for use in the public network for access to third party system 750. In some instances, the authentication tokens issued by enterprise identity provider server 710 might not be recognized and interpreted by federated identity provider server 760. As a result, the authentication tokens that enables the user devices to access the enterprise system, might not be sufficient to permit the user devices to access third party system 750. In this scenario, enterprise server 720 may re-direct requests from user devices 730 and 740 to access third party system 750 to a login page managed and authenticated by federated identity provider server 760.

Federated identity provider server 760 may be a server responsible for providing an identity platform for federated logon access to third party system 750 in public network 780. Specifically, federated identity provider server 760 may be responsible for generating, updating, and managing tokens for user devices 730 and 740 to have access to third party system 750. As such, the relying party may obtain an authentication token from federated identity provider server 760 on behalf of user devices 730 and 740 that enables them to access the services and resources in third party system 750. For example, a relying party may direct user devices 730 and 740 to log into an identity platform provided by federated identity provider server 760 and obtain a second authentication token.

Upon receiving a request from enterprise server 720 for access to third party system 750, federated identity provider server 760 may issue a second authentication token for the authenticated user and forward the second authentication token to enterpriser server 720, which in turn may enable user devices 730 and 740 to have SSO access to the services and resources in third party system 750. As an example, enterprise server 720 may store the second authentication token in key store 714 with a reference associating the first authentication token with the second authentication token.

Federated identity provider server 760 may execute instructions that enable federated identity provider server 760 to accept and/or process authentication tokens to be used in third party system 750. Following the above example, for subsequent requests from user devices 730 and 740 to access third party system 750, user devices 730 and 740 may present to enterprise server 720 an authentication token to be used in the enterprise system as a result of successful login to enterprise system within enterprise network 770. In response to the completion of the login process, enterprise server 720 may retrieve the corresponding authentication token to be used in third party system 750 from key store 714 based on the reference associating these two tokens to be used in their respective systems. Federated identity provider server 760 may interpret the authentication token associated with third party system 750 and take proper actions to enable the relying party to have SSO access to third party system 750 as discussed in greater detail below in connection with FIGS. 8A-8D.

FIGS. 8A-8D depict an example event sequence for extending single-sign-on to relying parties of federated logon providers in accordance with one or more illustrative aspects described herein. The communications between components of FIGS. 8A-8D may be encrypted via Transport Layer Security (TLS) cryptographic protocols or Internet Protocol Security (IPsec) tunnels that provide communications security over a computer network.

Figure 8A:
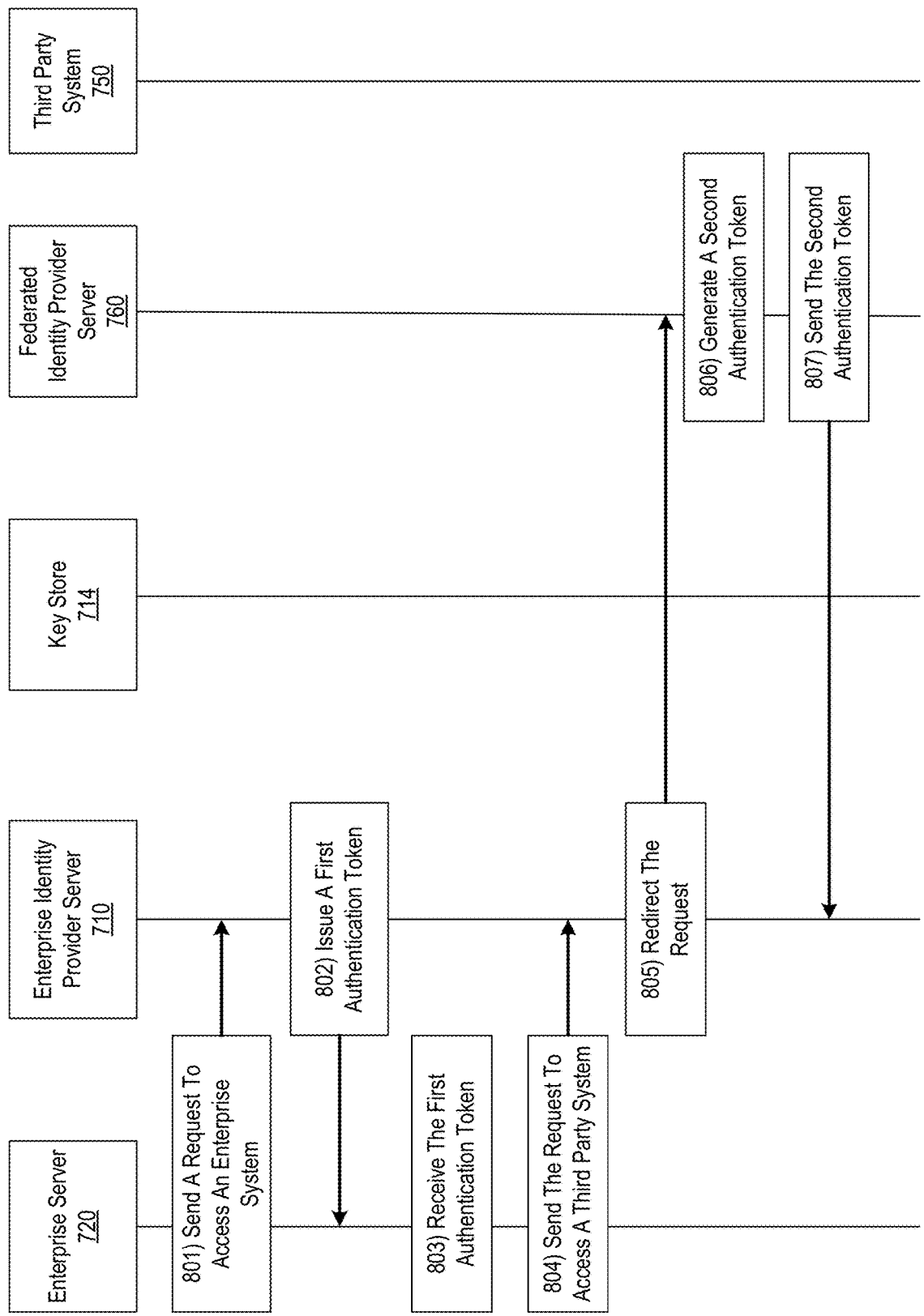

Referring to FIG. 8A, at step 801, an enterprise server may send a request to access to an enterprise system to an enterprise identity provider. Prior to beginning the steps shown in FIGS. 8A-8D, user devices 730 and 740 may send requests to enterprise server 720 to access one or more services or resources of the enterprise system within enterprise network 770. For example, the user may attempt to log into a virtual desktop, web application or mobile application to access a virtual, cloud-based enterprise system where enterprise server 720 may be integrated with an enterprise identity service provided by enterprise identity provider server 710. Subsequently, enterprise server 720 may forward such requests on behalf of user devices 730 and 740 to enterprise identity server 710 for authentication.

At step 802, an enterprise identity provider server may issue a first authentication token to the enterprise server. For example, enterprise identity provider server 710 may issue a first authentication token to enterprise server 720, as a result of the user successfully logging into the virtual, cloud-based enterprise system. Additionally, the first authentication token, which may be interpreted by enterprise identity provider server 710 to permit the user devices to access services and resources managed by enterprise server 720 in the virtual, cloud-based enterprise system. Enterprise identity provider server 710 may send the first authentication token to enterprise server 720.

At step 803, the enterprise server may receive the first authentication token from the enterprise identity provider server. In particular, the first authentication token may enable user devices managed by the enterprise server to have single-sign-on access to one or more resources using an enterprise identity service provided by the enterprise identity server. For example, enterprise server 720 may receive the first authentication token from enterprise identity provider server 710. As an example, enterprise server 720 may store the first authentication token in key store 714. In some instances, the first authentication token may be specific to enterprise identity provider server 710 and may be interpreted by enterprise identity provider server 710, which may enable user devices 730 and 740 to have SSO access to various services and resources provided by the enterprise system within enterprise network 770. SSO may be a property of access control of multiple related, yet independent services and resources in an enterprise system. As an example, a user may log in with a single ID and password to gain access to connected systems without using different usernames or passwords, or seamlessly sign on at each system. Accordingly, a single authentication may provide access to multiple applications, services and resources by passing the first authentication token seamlessly in the enterprise system integrated with enterprise identity provider server 710. As such, enterprise server 720 may be provisioned with the first authentication token.

At step 804, the enterprise server may send a request to the enterprise identity provider server to access a third party system. In particular, enterprise identity provider server 710 may receive, via the communication interface, a request from the enterprise server 720 to access the one or more resources provided by third party system 750 using a federated identity service. For example, enterprise server 720 may send a request to access one or more services or resources in third party system 750 that may be integrated with a federated identity service provided by federated identity provider server 760. In some instances, user devices 730 and 740 may originate the requests to access third party system 750 and forward such requests to enterprise server 720. In some instances, the third party system might not integrate directly with the enterprise system, and thus, might not trust or understand the first authentication token issued by enterprise identity provider server 710.

At step 805, the enterprise identity provider server may redirect the request to access the third party system to a federated identity provider. In particular, the enterprise identity provider server may redirect, via the communication interface, the request from the enterprise server to the federated identity service provided by the federated identity provider server. For example, enterprise identity provider server 760 may redirect the request to access third party system 750 to federated identity provider server 760. The enterprise identity provider server may redirect the request to access the third party system to federated identity provider server 760. Federated identity provider server 760 may maintain and manage a login page that may accept the requests from enterprise identity provider server 760 for access to third party system 750.

At step 806, the federated identity provider server may generate a second authentication token. For example, federated identity provider server 760 may generate a second authentication token that may enable user devices 730 and 740 to have SSO access to resources and services provided in the third party system. In some instances, when user devices attempt to login using the federated identity service, federated identity provider server 760 may issue an evidence of the successful sign-in the format of a SAML token, OpenID Connect Identity token, OAuth Access Token, or other form of token (which may, e.g., be referred to as the "second" authentication token in this example event sequence). In particular, such a second authentication token may enable the user devices managed by the enterprise server to have single-sign-on access to the third party system using the federated identity service.

In some instances, the type of evidence of successful login issued by federated identity provider 76o may range from an authentication or identity token, to specialized claims or assertions that come from federated identity provider server 760. In some instances, the second authentication token may be any evidence to enable integrations between the enterprise system with third party systems 750.

Figure 8B:
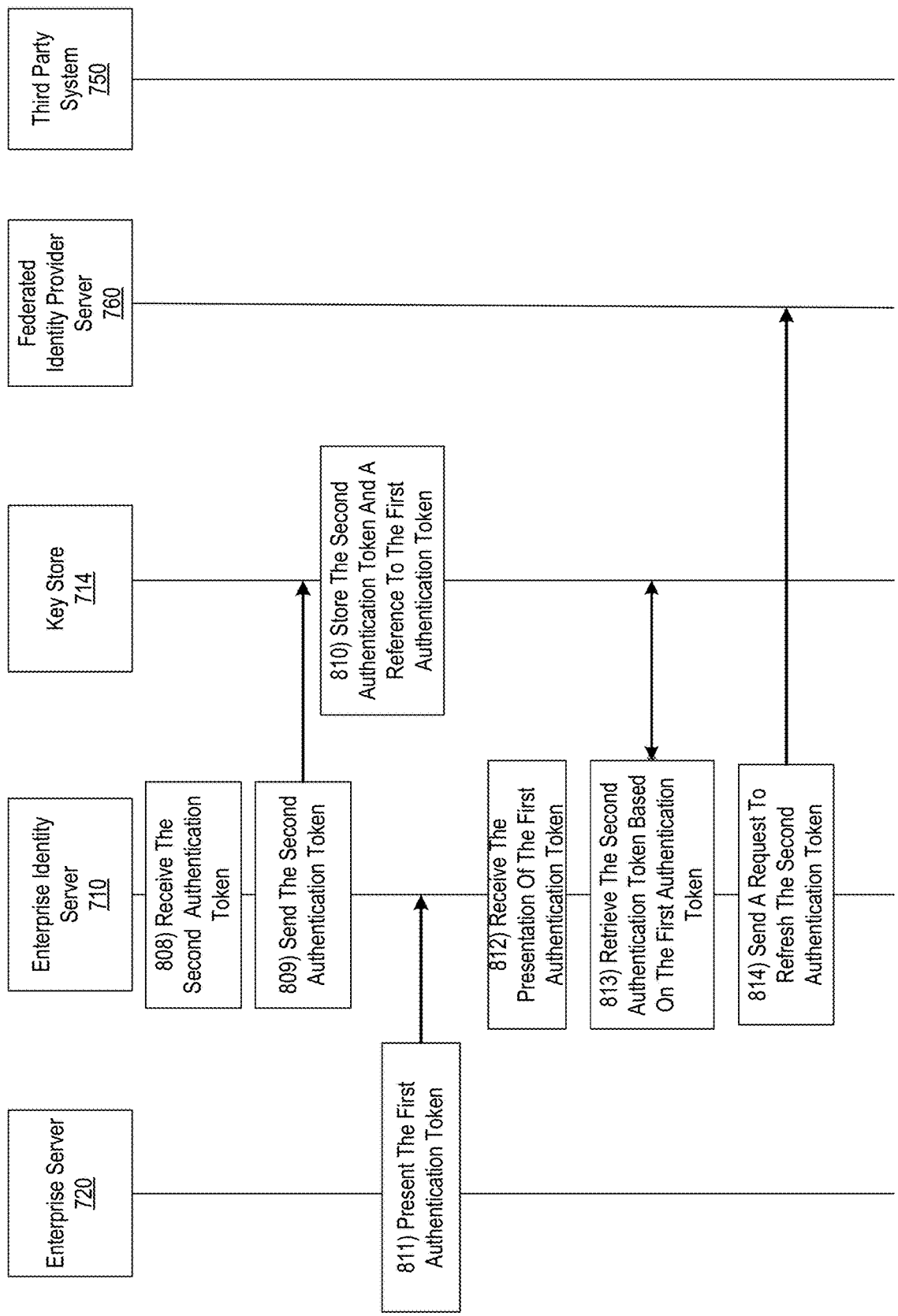

At step 807, the federated identity provider server may send the second authentication token to the enterprise identity provider server, and at step 808, in FIG. 8B, the enterprise identity provider server may receive the second authentication token. For example, federated identity provider server 760 may send the second authentication token to enterprise identity provider server 710, and at step 808, as illustrated in FIG. 8B, enterprise identity provider server 710 may receive the second authentication token.

At step 809, the enterprise identity provider server may send the second authentication token to a token store. For example, enterprise identity provider server 710 may send the second authentication token to token store 714. In some instances, enterprise identity provider server 710 may maintain a key store 714 that may be part of a mission-critical infrastructure and may be tamper-resistant, where enterprise identity provider server 710 may securely manage and protect authentication tokens and secrets that may be used by cloud-enabled applications and services.

At step 810, the token store may store the second authentication token and a reference associating the second authentication token with the first authentication token. In particular, the enterprise identity provider server may store in its memory additional instructions that, when executed by the at least one processor, cause the enterprise identity provider server to store, in the token store, the second authentication token and a reference associating the second authentication token with the first authentication token.

At step 811, for subsequent requests from the enterprise server to access the third party system, the enterprise server may present the first authentication token to the enterprise identity provider server. Specifically, the first authentication token may be previously issued to the enterprise server by the enterprise identity provider server at step 802. For example, enterprise server 720 may present the first authentication token to the enterprise identity provider server 710 on behalf of user devices 730 and 740 attempting to access third party system 750.

At step 812, the enterprise identity provider server may receive presentation of the first authentication token. In particular, the enterprise identity provider may receive, via the communication interface, from an enterprise server integrated with an enterprise identity service provided by the enterprise identity provider server, a first authentication token previously issued to the enterprise server by the enterprise identity provider server. For example, enterprise identity provider server 710 may receive presentation of the first authentication token from enterprise server 720.

At step 813, the enterprise identity provider server may retrieve the second authentication token from the token store based on a reference to the first authentication token. In particular, in response to receiving the first authentication token, the enterprise identity provider server may retrieve, from a token store maintained by the enterprise identity provider server, a second authentication token associated with a federated identity service provided by a federated identity provider server. For example, enterprise identity provider server 710 may retrieve the second authentication token from token store 714 based on a reference associating the second authentication token with the first authentication token.

In some instances, enterprise identity provider server 710 may issue a first authentication token and may use the first authentication token to assert identities of the users inside the enterprise system. Given that the third party system may be foreign to the enterprise system, the present disclosure may hide the complexity of the third party system and the federated identity service from its users. Likewise, the embodiments of the present disclosure may eliminate the need for the third party systems that integrate with the enterprise system to know and understand the first authentication token issued from enterprise identity provider server 710.

In some instance, the present disclosure may enable third party system 750 that integrated with enterprise identity provider server 760 to call an API, passing in the first authentication token that enterprise identity provider server 760 issued itself, and receiving back the second authentication token that federated identity provider server 760 issued to assert identity through the token exchange process implemented via the reference associating the authentication tokens in token store 714.

In some instances, the present disclosure may enable that a UI having a login page provided by enterprise identity provider server 710, to switch to using the second authentication token when navigating to third party system 750, upon a determination that an administrator, via enterprise identity provider server 710, has obtained the second authentication token and logged onto third party system 750 at some point in time prior to the current request to access third party system 750.

At step 814, the enterprise identity provider server may send a request to the federated identity provider server to refresh the second authentication token. In particular, the enterprise identity provider server may send, via the communication interface, a request to the federated identity provider server to regenerate the second authentication token, and the federated identity provider server may generate the refreshed authentication token. For example, enterprise identity provider server 710 may send a request to federated identity provider server 760 to refresh the second authentication token associated with the user or user devices attempting to access third party system 750. In some instance, the second authentication token issued to enterprise identity provider server 710 for that user or user devices may have a life time attached. As an example, the second authentication token may last for an hour. In those scenarios, the second authentication token may need to be refreshed. In contrast, the life time of the first authentication token issued by enterprise identity provider server 710 may be independent from that of the second authentication token. As another example, refreshing the second authentication token may be done on-demand In the event that the second authentication token may be longer-lived than the first authentication token, the on-demand refresh initiated via enterprise identity provider server 710 may be able to refresh and return a refreshed authentication token that may be still alive. In an alternative, if the second authentication token is not long-lived enough compared to the lifetime of the first authentication token, enterprise identity provider 710 may initiate a background thread refreshing the second authentication token before the expiration of the second authentication token.

Turning to FIG. 8C, at step 815, the federated identity provider server may regenerate a refreshed authentication token. In particular, enterprise identity provider server may refresh the second authentication token with the federated identity service provided by the federated identity provider server to obtain a refreshed authentication token. For example, federated identity provider server 760 may regenerate a refreshed authentication token in response to the request from enterprise identity provider server 710.

At step 816, the federated identity provider server may send the refreshed authentication token to the enterprise identity provider server, and at step 817, the enterprise identity provider server may receive the refreshed authentication token. For example, federated identity provider server 760 may send the refreshed authentication token to the enterprise identity provider server 710, and enterprise identity provider server 710 may receive the refreshed authentication token.

At step 818, the enterprise identity provider server may send the refreshed authentication token to the token store. For example, enterprise identity provider server may send the refreshed authentication token to the token store 714 for storage.

At step 819, the token store may store the refreshed authentication token and a reference associating the refreshed authentication token with the first authentication token. In particular, in response to refreshing the second authentication token, enterprise identity provider server 710 may store, in the token store 714, the refreshed authentication token and a reference associating the refreshed authentication token with the first authentication token. As an example, enterprise identity provider server 710 may update a record of a second authentication token in key store 714 with the refreshed authentication token. Likewise, enterprise identity provider server 710 may update a reference associating the refreshed authentication token with the first authentication token in the record.

Figure 8D:
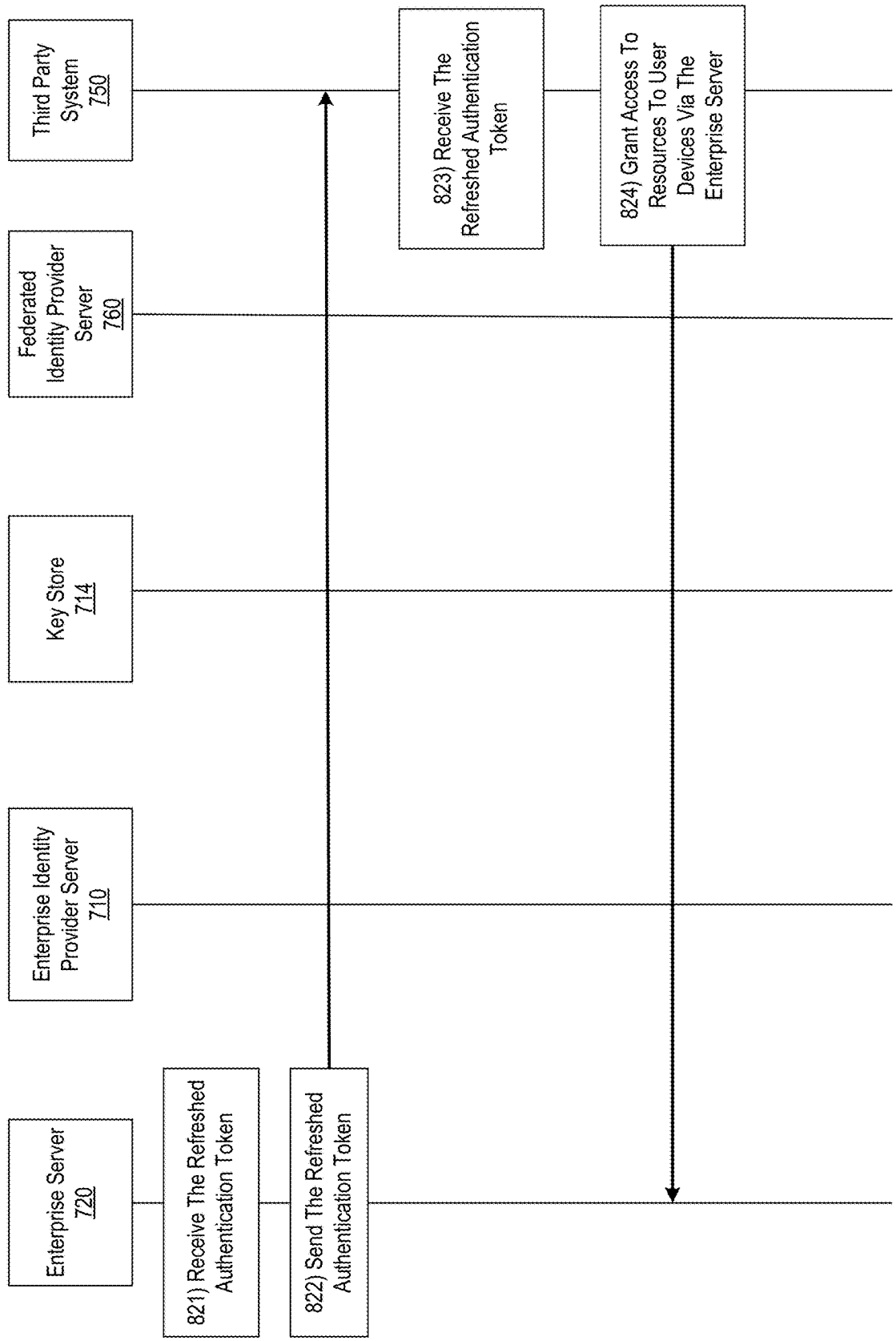

At step 820, the enterprise identity provider server may send the refreshed authentication token to the enterprise server. In particular, the enterprise identity provider may send, via the communication interface, to the enterprise server, the refreshed authentication token, and sending the refreshed authentication token to the enterprise server may enable user devices managed by the enterprise server to access one or more resources provided by a third party system using the federated identity service. For example, enterprise identity provider server 710 may send the refreshed authentication token to enterprise server 720. Turning to FIG. 8D, at step 821, the enterprise server may receive the refreshed authentication token.

At step 822, the enterprise server, on behalf of the user devices, may send the refreshed authentication token to the third party system for access. For example, enterprise server 720, on behalf of user devices 730 and 740, may send the refreshed authentication token to federated identity provider server 760 integrated with third party system 750 for access.

Finally, at step 823, the third party system may receive the refreshed authentication token; and at step 824, the third party system may grant access to the services and resources provided by the third party system using the federated authentication service. For example, federated identity provider server 760 integrated with third party system 750 may grant permission to the services and resources provided by third party system 750 using the federated authentication service. As a result, such permission may be granted to user devices 730 and 740 via enterprise server 720.

Figure 9:
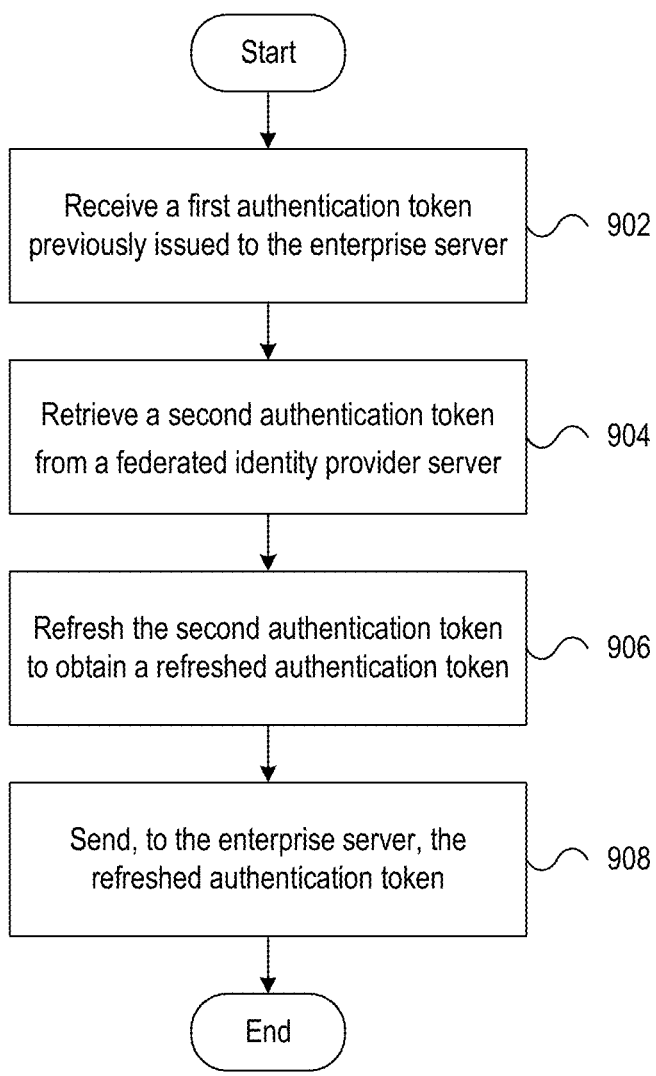
FIG. 9 depicts an example method of extending single-sign-on to relying parties of federated logon providers in accordance with one or more illustrative aspects described herein.

FIG. 9 depicts an illustrative method for extending single-sign-on to replying parties of federated logon providers in accordance with one or more example embodiments. Referring to FIG. 9, at step 902, an enterprise identity provider server (e.g. enterprise identity provider server 710) having at least one processor, a communication interface, and memory, may receive, via the communication interface, from an enterprise server integrated with an enterprise identity service provided by the enterprise identity provider server, a first authentication token previously issued to the enterprise server by the enterprise identity provider server. At step 904, in response to receiving the first authentication token, the enterprise identity provider server may retrieve, from a token store maintained by the enterprise identity provider server, a second authentication token associated with a federated identity service provided by a federated identity provider server. At step 906, the enterprise identity provider server may refresh the second authentication token with the federated identity service provided by the federated identity provider server to obtain a refreshed authentication token. At step 908, the enterprise identity provider server may send, via the communication interface, to the enterprise server, the refreshed authentication token. Accordingly, sending the refreshed authentication token to the enterprise server may enable user devices managed by the enterprise server to access one or more resources provided by a third party system using the federated identity service.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    receiving, by a computing device, a second authentication token from a federated identity provider server, the second authentication token configured to enable access to a second set of resources in a third-party system using a federated identity service provided by the federated identity provider server;
    providing, by the computing device, a first authentication token to an enterprise server, the first authentication token configured to assert identities of users within a computing environment hosted by the enterprise server, and enable access to a first set of resources in an enterprise system; and
    providing, by the computing device, the second authentication token to the enterprise server in response to receipt, by the enterprise server, of the first authentication token so that the enterprise server enables access to the second set of resources in the third-party system, the third-party being outside the enterprise system:
    sending a request to the federated identity provider server to regenerate the second authentication token, wherein the federated identity provider server generates a refreshed authentication token; and
    sending to the enterprise server, the refreshed authentication token, wherein sending the refreshed authentication token to the enterprise server enables user devices managed by the enterprise server to access the second set of resources.

2. The method of claim 1, further comprising:
    storing, in a token store, the second authentication token and a reference associating the second authentication token with the first authentication token.

3. The method of claim 1, further comprising:
    receiving the refreshed authentication token from the federated identity provider server.

4. The method of claim 2, further comprising:
    updating the token store with the refreshed authentication token and a reference associating the refreshed authentication token with the first authentication token.

5. The method of claim 1, further comprising:
    redirecting a request from the enterprise server to the federated identity service provided by the federated identity provider server.

6. The method of claim 1, further comprising:
    retrieving, from a token store, the second authentication token based on a reference associating the second authentication token with the first authentication token.

7. An enterprise identity provider server device, comprising:
    at least one processor;
    a communication interface;
    memory storing instructions that, when executed by the at least one processor, cause the server device to:
        receive, via the communication interface, a second authentication token from a federated identity provider server, the second authentication token configured to enable access to a second set of resources in a third-party system using a federated identity service provided by the federated identity provider server;
        provide, via the communication interface, a first authentication token to an enterprise server, the first authentication server token configured to assert identities of users within a computing environment hosted by the enterprise server, and enable access to a first set of resources in an enterprise system; and
        provide, via the communication interface, the second authentication token to the enterprise server in response to receipt, by the enterprise server, of the first authentication token so that the enterprise server enables access to the second set of resources in the third-party system, the third-party system being outside the enterprise system;
        send a request to the federated identity provider server to regenerate the second authentication token, wherein the federated identity provider server generates a refreshed authentication token; and
        send to the enterprise server, the refreshed authentication token, wherein sending the refreshed authentication token to the enterprise server enables user devices managed by the enterprise server to access the second set of resources.

8. The enterprise identity provider server device of claim 7, wherein the memory stores additional instructions that, when executed by the at least one processor, cause the server device to:
    store, in a token store, the first authentication token and a reference associating the first authentication token with the second authentication token.

9. The enterprise identity provider server device of claim 7, wherein the memory stores additional instructions that, when executed by the at least one processor, cause the server device to:
receive, via the communication interface, the refreshed authentication token from the federated identity provider server.

10. The enterprise identity provider server device of claim 8, wherein the memory stores additional instructions that, when executed by the at least one processor, cause the server device to:
update the token store with the refreshed authentication token and a reference associating the refreshed authentication token with the first authentication token.

11. The enterprise identity provider server device of claim 7, wherein the memory stores additional instructions that, when executed by the at least one processor, cause the server device to:
redirect, via the communication interface, a request from the enterprise server to the federated identity service provided by the federated identity provider server.

12. The enterprise identity provider server device of claim 7, wherein the memory stores additional instructions that, when executed by the at least one processor, cause the server device to:
retrieve, from a token store, the second authentication token based on a reference associating the first authentication token with the second authentication token.

13. A non-transitory computer-readable medium storing instructions that, when executed, cause:
receiving a second authentication token from a federated identity provider server, the second authentication token configured to enable access to a second set of resources in a third-party system using a federated identity service provided by the federated identity provider server;
providing a first authentication token to an enterprise server, the first authentication token configured to assert identities of users within a computing environment hosted by the enterprise server, and enable access to a first set of resources in an enterprise system; and
providing the second authentication token to the enterprise server in response to receipt, by the enterprise server, of the first authentication token so that the enterprise server enables access to the second set of resources in the third-party system, the third-party being outside the enterprise system:
sending a request to the federated identity provider server to regenerate the second authentication token, wherein the federated identity provider server generates a refreshed authentication token; and
sending to the enterprise server, the refreshed authentication token, wherein sending the refreshed authentication token to the enterprise server enables user devices managed by the enterprise server to access the second set of resources.

14. The non-transitory computer-readable medium of claim 13, wherein the instructions, when executed, further cause:
storing, in a token store, the second authentication token and a reference associating the second authentication token with the first authentication token.

15. The non-transitory computer-readable medium of claim 13, wherein the instructions, when executed, further cause:
receiving the refreshed authentication token from the federated identity provider server.

16. The non-transitory computer-readable medium of claim 13, wherein the instructions, when executed, further cause:
redirecting a request from the enterprise server to the federated identity service provided by the federated identity provider server.

17. The non-transitory computer-readable medium of claim 13, wherein the instructions, when executed, further cause:
retrieving, from a token store, the second authentication token based on a reference associating the first authentication token with the second authentication token.

* * * * *